(12) United States Patent
Tardie et al.

(10) Patent No.: US 11,275,871 B2
(45) Date of Patent: Mar. 15, 2022

(54) SYSTEMS AND METHODS FOR MODIFYING CAD FILES

(71) Applicants: Michael Tardie, Lunenburg, MA (US); Benjamin Doucette, Nashua, NH (US); Jose L. Carrasco, Amherst, NH (US)

(72) Inventors: Michael Tardie, Lunenburg, MA (US); Benjamin Doucette, Nashua, NH (US); Jose L. Carrasco, Amherst, NH (US)

( * ) Notice: Subject to any disclaimer, the term of this patent is extended or adjusted under 35 U.S.C. 154(b) by 366 days.

(21) Appl. No.: 16/283,917

(22) Filed: Feb. 25, 2019

(65) Prior Publication Data

US 2020/0272700 A1 Aug. 27, 2020

(51) Int. Cl.
*G06F 30/00* (2020.01)

(52) U.S. Cl.
CPC ................... *G06F 30/00* (2020.01)

(58) Field of Classification Search
CPC .......... G06F 30/00; G06F 30/10; G06F 30/12; G06F 2111/00; G06F 2111/02; G06F 2111/04; G06F 2111/20; G06F 3/0486; G06F 3/0482
USPC ............................................................ 703/1
See application file for complete search history.

(56) References Cited

U.S. PATENT DOCUMENTS

| | | | |
|---|---|---|---|
| 6,898,477 B2 | 5/2005 | Loughran | |
| 7,039,569 B1 | 5/2006 | Haws et al. | |
| 7,552,032 B2 | 6/2009 | Krishnapillai | |
| 8,441,502 B2 | 5/2013 | Reghetti et al. | |
| 2003/0071810 A1 | 4/2003 | Shoov et al. | |
| 2003/0103089 A1* | 6/2003 | Ramani | G06F 30/00 715/848 |
| 2006/0190116 A1* | 8/2006 | Almeida | G06F 30/39 700/102 |
| 2007/0078634 A1* | 4/2007 | Krishnapillai | G06F 30/00 703/1 |
| 2008/0221840 A1 | 9/2008 | Bassi et al. | |
| 2009/0228328 A1 | 9/2009 | Gagan et al. | |
| 2010/0070241 A1 | 3/2010 | Opdahl et al. | |
| 2010/0268513 A1 | 10/2010 | Loberg | |
| 2012/0109589 A1 | 5/2012 | Thompson et al. | |
| 2012/0281013 A1 | 11/2012 | Mahdavi et al. | |
| 2013/0144566 A1* | 6/2013 | De Biswas | G06T 17/005 703/1 |

(Continued)

FOREIGN PATENT DOCUMENTS

| | | |
|---|---|---|
| WO | 2005033912 | 4/2005 |
| WO | 2013161824 | 10/2013 |
| WO | 2017085694 | 5/2017 |

*Primary Examiner* — Cedric Johnson
(74) *Attorney, Agent, or Firm* — Lambert Shortell & Connaughton; David J. Connaughton, Jr.; Justin P. Tinger

(57) ABSTRACT

A method of modifying CAD documents is provided, the method including use of a CAD modifying application that enables a user to modify a plurality of CAD documents outside of a native CAD environment. In another embodiment, the application may be integrated into a native CAD environment. The method includes using the CAD modifying application to build a workflow environment from existing CAD files, configure parameters and components of the workflow environment according to desired modification, and generating the modified CAD documents by instructing the CAD modifying application to communicate with existing CAD software.

20 Claims, 5 Drawing Sheets

(56) References Cited

U.S. PATENT DOCUMENTS

2014/0100824 A1\* 4/2014 Bess ...................... G06F 30/15
                                                      703/1
2015/0213157 A1   7/2015 Hepworth et al.
2016/0246899 A1\* 8/2016 Hirschtick .............. G06F 30/17

\* cited by examiner

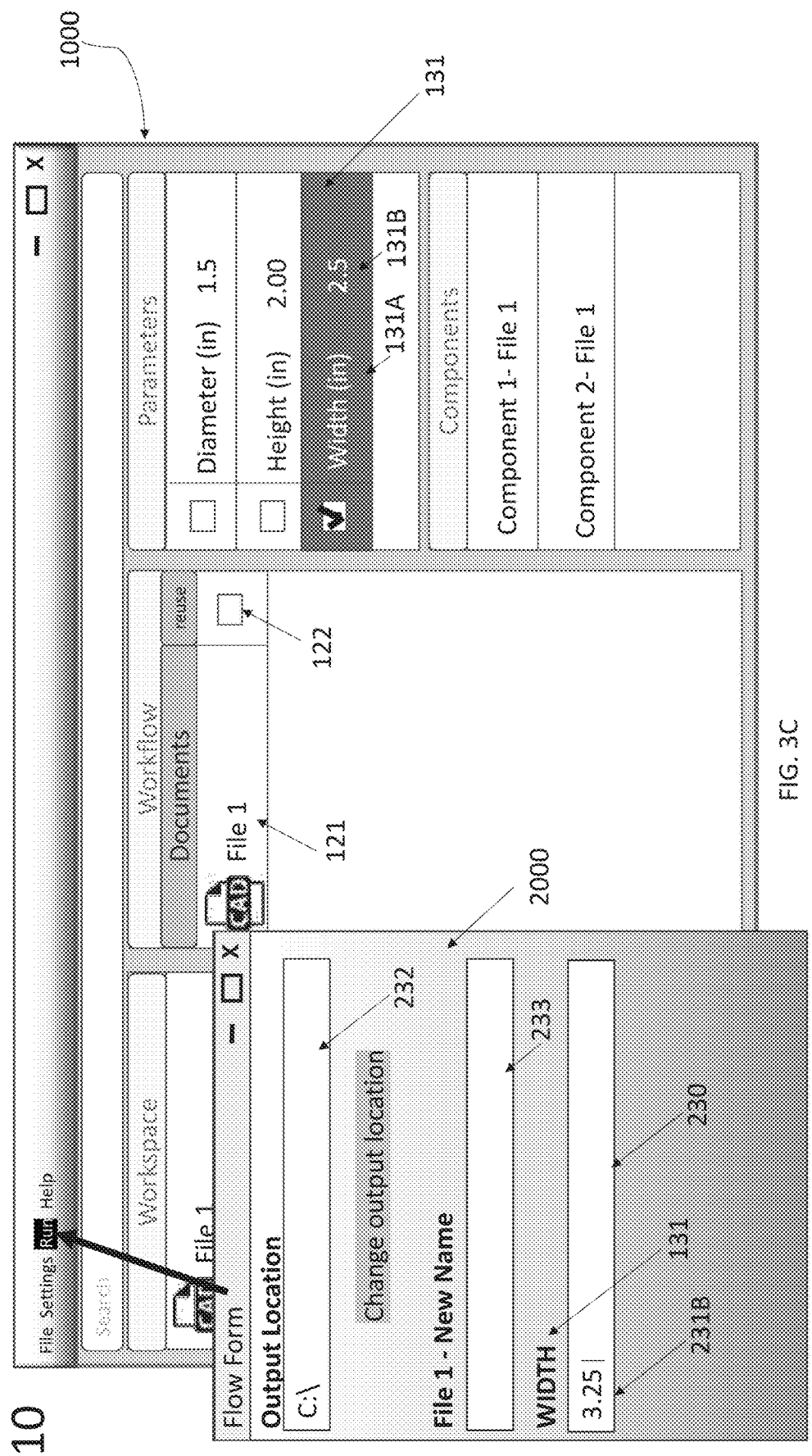

SYSTEMS AND METHODS FOR MODIFYING CAD FILES

FIELD OF THE INVENTION

The present disclosure relates broadly to systems and methods for computer aided design (CAD). More specifically, the present disclosure relates to systems and methods capable of interfacing with existing CAD software and its associated files, where the disclosed systems and methods advantageously enable one or more existing assemblies modeled in CAD software comprising several files, presentation files, drawing files, and the like, to be quickly manipulated in a single process.

DESCRIPTION OF RELATED ART

Numerous computer aided design (CAD) programs exist. CAD software is a powerful tool used in architecture, engineering, and product design across several industries. While features may vary from individual program to program, CAD software generally provides users with an interface that enables the user to create virtual models of real-world objects. CAD software typically provides a two-dimensional (2D) interface where a user can specify the parameters of a given object in vector form in an x, y, z plane. Most CAD software further enables the user to view the 2D object as a three-dimensional (3D) model generated from the user-created 2D vectors.

CAD software further allows for multiple virtually modeled objects to be compiled into a single master virtual model. A single item of manufacture may for example include many individual objects, referred to herein as components. In such instances, the item of manufacture can be referred to as an assembly. CAD software further enables component files to be combined according to user specified configurations that reflect how the components are intended to interface in the real, non-virtual, assembly. The action of combining individual component files thus generates a single master file that reflects a virtual model of an assembly.

Often in design and modeling process, it is desirable to modify certain aspects of components. However, when a single component in an assembly is modified in a given manner, other components within the assembly must also be modified, such that the entire model of the assembly remains configured as intended. To accomplish this, each and every component must thus separately be modified. Typically, a user would perform these actions by opening each component file individually and making the desired changes. This is tedious and time consuming.

Some CAD programs have attempted to automate this process, but the existing solutions to automation are limited. In existing software having automation capabilities, in order for parametric changes to be automated, a user modeling a component must know in advance that parametric changes to the component might be desired. The user must also model each respective component affected by any parametric changes in other components accordingly, such that the components cross-reference one another. These existing CAD automation processes are thus limited because the automation process is built into the creative process of modeling components. If components are not initially modeled to contemplate parametric changes and such changes are desired, the components must be remodeled. The ability to apply parametric changes across multiple modeled components, even when automated, continues to be time intensive and/or requires advanced knowledge in computational programming.

SUMMARY

The subject matter of this disclosure may involve, in some cases, interrelated products, alternative solutions to a particular problem, and/or a plurality of different uses of a single system or application.

In accordance with aspects and embodiments disclosed herein, a method of modifying a first CAD file stored in a computer memory of a computer is provided wherein the computer comprising CAD software and a CAD modifying application, the method comprising the steps of building a workflow environment in the CAD modifying application, where the CAD modifying application runs on the computer separately from the CAD software, the workflow environment including the first CAD file; modifying at least one parameter associated with the at least one CAD file to create at least one modified parameter within the CAD modifying application; generating a second CAD file from the first CAD file and the at least one modified parameter from the CAD modifying application; and storing the generated second CAD file in the computer memory. In other embodiments, the CAD modifying application may be integrated into the CAD software. As used herein, the step of generating the second CAD file also includes saving an updated version of the first CAD file and overwriting the first CAD file.

In accordance with embodiments, building the workflow environment includes selecting the first CAD file from a plurality of CAD files displayed in a workspace environment, where the workspace environment and workflow environment are displayed by the CAD modifying application in a single window of a display of the computer.

In accordance with embodiments, the workspace environment is created by opening the CAD modifying application. The workspace environment displays all CAD files stored in the computer, or in a directory or directories of the computer, on the display of the computer. The workflow environment may be created by dragging and dropping (or other input method) the first CAD file from the workspace environment into the workflow environment using a user interface and an input of the computer.

In accordance with embodiments, selecting the first CAD file from the plurality of CAD files displayed in the workspace environment populates a parameter environment. The first CAD file may be an assembly file that includes at least two component files. In accordance with embodiments, when the first CAD file is an assembly file, selecting the first CAD file in the workspace environment populates a component environment. The component environment corresponds to the at least two component files of the selected assembly file.

In accordance with embodiments, selecting a parameter from the parameter environment generates an interactive form within the CAD modifying application having a corresponding editable parameter window.

In accordance with embodiments, a user inputs, through an input device, a modified parameter value in the editable parameter window presented on the computer display, where the modified parameter value is different from the parameter value in the first CAD file. In accordance with embodiments, the user inputs from the interactive form are communicated by the CAD modifying application to the CAD software and communication of the inputs from the CAD modifying application causes the CAD software to output a second, modified CAD file.

In accordance with aspects and embodiments, a method of modifying a plurality of CAD files is provided, the method comprising opening CAD software, opening a CAD modifying application, importing original CAD files into the CAD modifying application, wherein the CAD modifying application extracts parameters and components from the imported original CAD files and displays the extracted parameters within the CAD-modifying application, using the CAD modifying application to assign a new value to at least one extracted parameter to create at least one modified parameter, and instructing the CAD modifying application to interface with the CAD software, wherein interfacing causes the CAD modifying software to communicate the at least one modified parameter to the CAD software and further causes the CAD software to generate a modified CAD files corresponding to the original CAD files having the at least one modified parameter. In other embodiments, the same operations may be used to modify components and file names.

In accordance with aspects and embodiments, the interactive forms may be saved on a computer memory for future use by the CAD modifying application. These saved interactive forms may be shared with other users and/or systems. Forms and associated files may be exported to a single data file.

In accordance with embodiments, the method further comprises saving the interactive form and the modified CAD files in a file bundle.

In accordance with embodiments, the method further comprises using the CAD modifying application to create a plurality of modified parameters. In other embodiments, the same operations may be used to modify components and file names.

In accordance with embodiments, after modified CAD files corresponding to the original CAD files having the plurality of modified parameters are generated, a second set of modified parameters are created and used to generate a second set of modified CAD files corresponding to the original CAD files having the second set of modified parameters.

In accordance with aspects and embodiments, the CAD modifying application may be cloud based and in some embodiments, may be a mobile application.

BRIEF DESCRIPTION OF THE DRAWINGS

FIGS. 3A, 3B, and 3C provide examples of a user interface in accordance with aspects and embodiments of the present disclosure.

DETAILED DESCRIPTION

Figure 1:
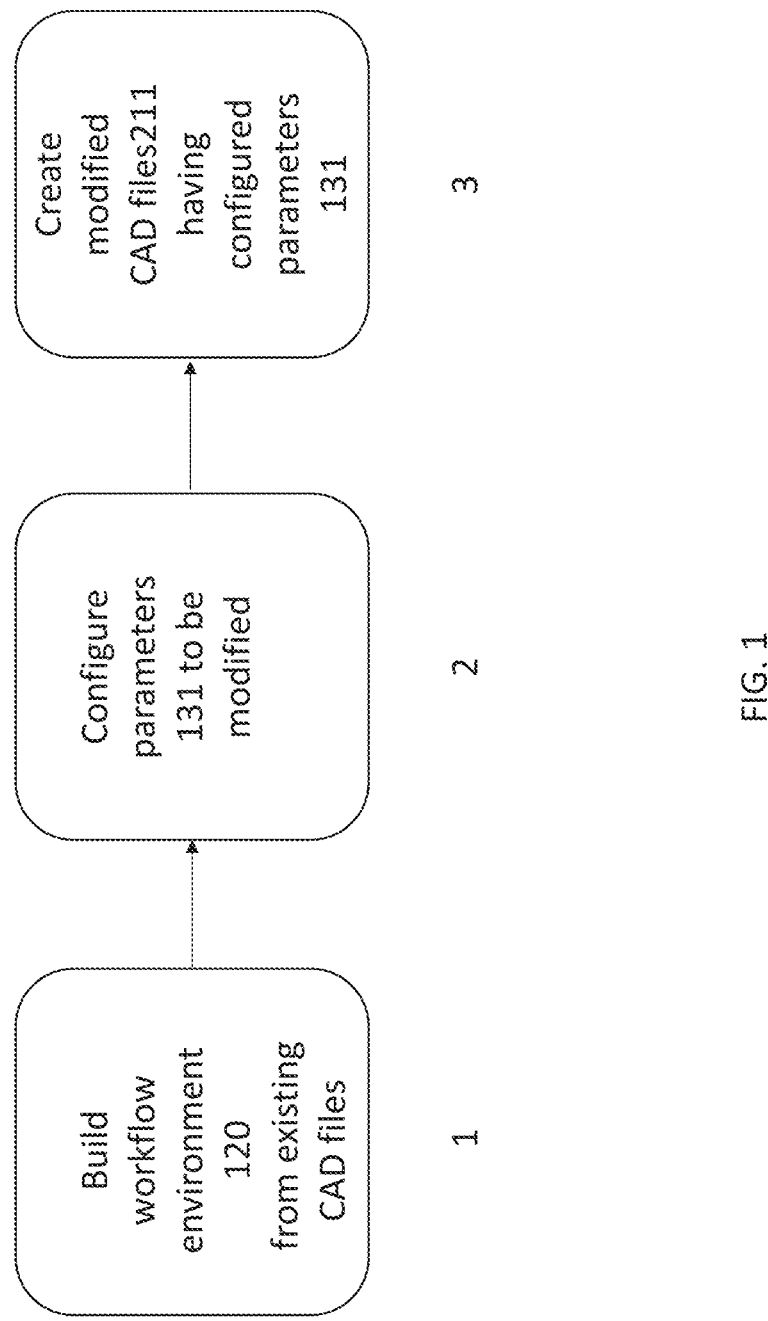
FIG. 1 provides a flow chart of an embodiment of the present disclosure.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In the description, specific details are set forth in order to provide a thorough understanding of the examples disclosed. In other instances, well-known methods, procedures, components and materials have not been described in detail as not to unnecessarily lengthen the present disclosure.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user input and/or output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions (referred to herein as "software," "program" and/or "application") may be stored in non-transitory computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As used herein, an "assembly" refers to two or more components combined in a defined manner. A "master file" refers to a virtual model of an assembly created by combining component files. It will be appreciated by those of skill in the art that a master file may contain sub-master files. Sub-master files include, for example, combinations of components into single files that are subsequently combined into a higher order master file. "Component file" as used herein refers to a virtual model of a component included in an assembly. The term "file" as used herein generally refers to CAD files, as well as drawing files and presentation files, and may for example be used interchangeably with the term "CAD document" and refers to a discrete amount of data, represented on the graphical user interface of a computer operating system as single icon that when opened in/read by CAD software, displays a virtual model of an object. "Object" as used herein refers to any real world item, including components and assemblies. "Environment" as used herein refers to a user interface presented on a computer display, which allows and/or guides a user's operation of, and providing inputs to, the computerized system. "Input" as used herein refers to a signal provided to the computer processor by an input device. Discussion of user's operation of the system is understood to require inputs and instructions by the user to cause a computer to carry out the required steps of operation. Similarly, discussion of various environments or aspects of an application, software, and/or program performing tasks should be understood to refer to said application, software and/or program causing the processor to act to achieve the desired result.

The present disclosure improves the functioning of a computer by improving, enhancing, and streamlining the manner in which computer aided design (CAD) models are modified by enabling a user to assign new values to parameters in existing CAD models without having to remodel each component having said parameter in the native CAD environment. The present disclosure improves CAD automation and solves the problems that exist in current solutions. The present disclosure provides software separate and distinct from CAD software that interfaces with existing CAD software to provide an automation process separate from the creative modeling process. The present disclosure advantageously allows users to modify a limitless number of CAD files. Moreover, the files need not be related to one another to be modified. The present disclosure thus allows a user to automate any CAD file, including component files used to generate a master file, regardless if the original components were created with automation in mind or not.

In accordance with aspects of the present disclosure, a CAD automation process is provided that enables simultaneous manipulation of multiple CAD documents outside the native CAD environment. The application contemplated by the disclosure enables a user to build a workflow environment, configure parameters of the workflow according to desired modifications, and create modified CAD files corresponding to the parameter configurations input by the user.

In accordance with aspects and embodiments, a process tree is disclosed in FIG. 1. Referring to FIG. 1, the sequence of steps performed by the user and received by the computerized application disclosed herein include in step 1, building a workspace of CAD files from existing CAD files. These CAD files can be files already stored in the memory of the computer, and from the workspace, a workflow environment is built. After having built the workflow environment, the user configures the parameters of the workspace CAD files it seeks to modify in step 2. In step 3, the computer is operable to run the application to create modified CAD files with the configured parameters of step 2. In accordance with aspects and embodiments, steps 1-3 are performed with CAD software running in the background of the application.

Figure 2:
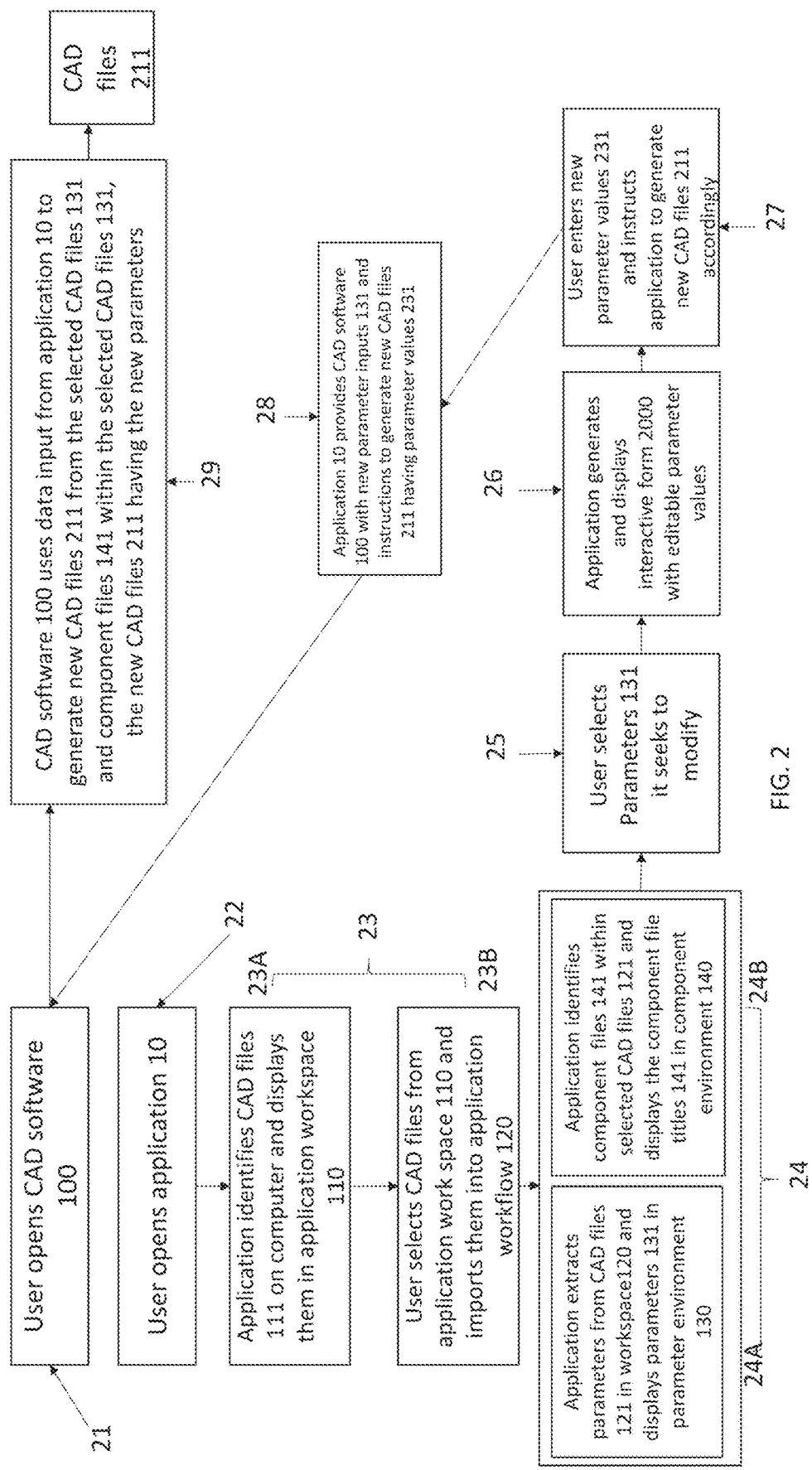
FIG. 2 provides a flow chart of an embodiment of the present disclosure.

In accordance with aspects and embodiments, a process tree of the disclosure is provided in FIG. 2. Application 10 contemplates that prior to opening of application 10, or at some point prior to creating new CAD files in accordance with step 3 of FIG. 1, in step 21 a user will open existing CAD software 100 stored in a computer memory by using an input device in communication with the computer memory and processor. The user will then in step 22 use the input device to open application 10, also stored in the computer memory.

Opening of application 10 in step 22 causes the computer to display on the computer's graphical user interface an interactive window associated with application 10. Opening of application 10 further causes application 10 to perform steps 23A and 23B, collectively referred to as step 23. In step 23A, application 10 searches the computer memory for existing CAD files stored on the computer. In certain embodiments, the search of the computer memory may be limited to a certain directory or directories, which may be identified by a user in some cases. Next, the computer is operable to identify existing CAD files as CAD files 111 and displays them in a workspace environment 110 of application 10. In step 23B, a user interacts with the workspace environment 110 of application 10 and selects which of the CAD files 111 it seeks to modify. User selected files are imported into a workflow environment 120 of application 10, and the CAD files displayed in the workflow environment become workflow CAD files 121.

A user's completion of step 23B causes application 10 to extract parameters 131 from workflow CAD files 121 in step 24A. Step 24A terminates with the extracted parameters 131 being displayed in a parameter environment 130 of application 10. In step 24B, which may be performed simultaneously with step 24A, application 10 identifies component files 141 within selected CAD files 131 and terminates with a display of these component files 141 in a component environment 140. Steps 22-24 build the complete workflow environment by the computer. It will be appreciated that when CAD files 110 are imported into the workflow environment 120, the workflow environment 120 necessarily populates parameter environment 130 and component environment 140.

A user configures the parameters 131 to be modified by selecting the desired parameters from the parameter environment 130 in step 25. Completion of step 25 results in application 10 generating and displaying in step 26 an interactive form 2000 separate from the first interactive window displayed by opening application 10, the interactive form 2000 window having editable parameters. In step 27, the user enters new parameter values 231 into the editable window of interactive form 2000 and instructs the application to generate new CAD files 211 having the new parameter values 231. Steps 25-27 comprise the steps where which the user configures the parameters. The application then communicates with CAD software 100 in step 28. Application 10 provides CAD software with new parameter values 231 and instructs CAD software 100 to modify files corresponding to workspace files 121 to generate new CAD files 211 having new parameter values 131.

In step 29, CAD software 100 uses the data provided by application 10 in step 28, and thus inputs provided by the user into form 2000, to generate new CAD files 211 having new parameters 231. The CAD software generates new modified files corresponding to workflow files 121 as well as modified files corresponding to any components 141. The output of the process is modified CAD files 211.

Figure 3A:
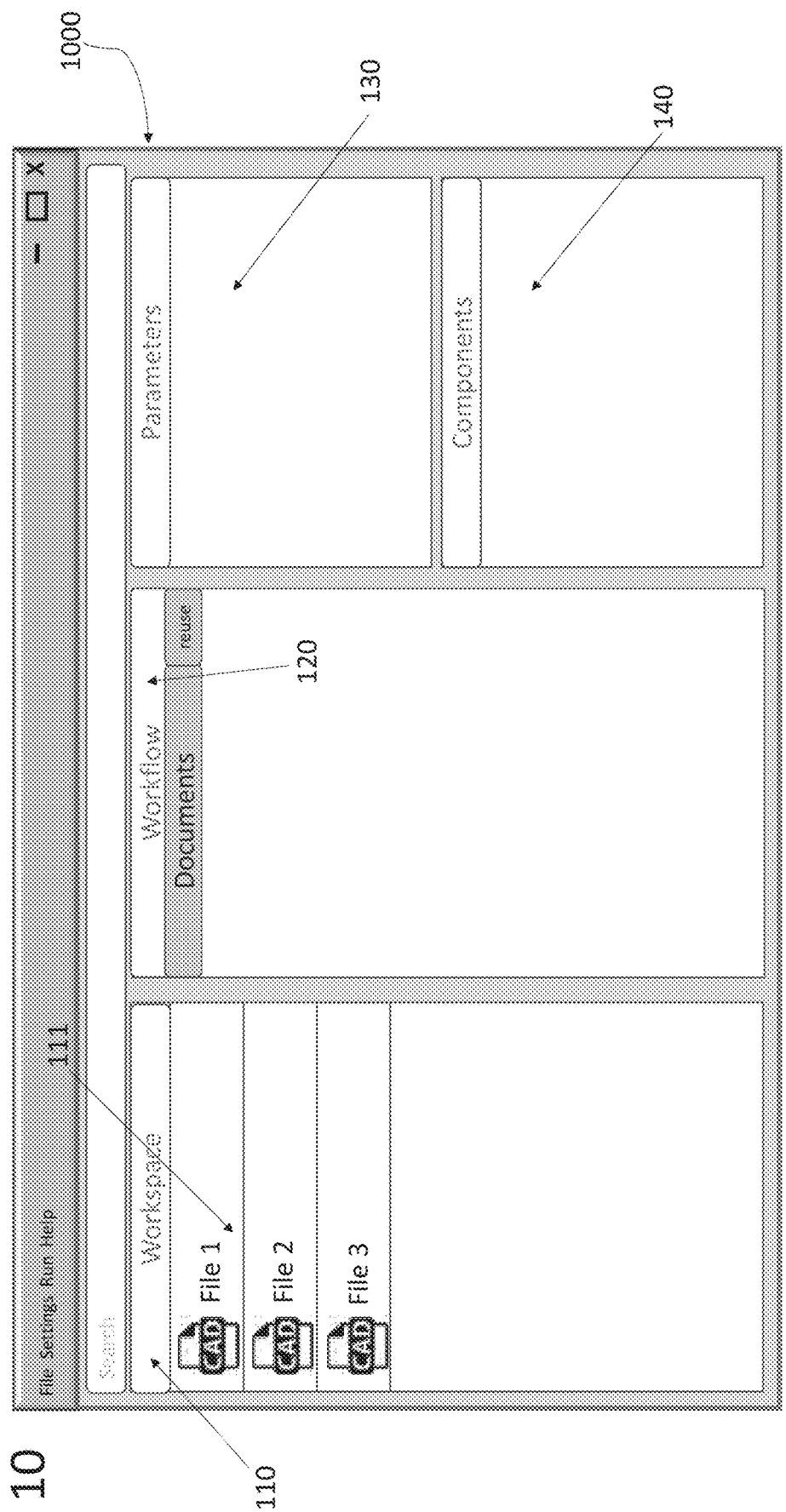

In one embodiment and referring to FIG. 3A in combination with FIG. 2, a display of an interactive automation suite 1000 provided to the user by application 10 is shown. Opening of application 10 displays interactive automation suite 1000 on the computer's graphical user interface. The interactive automation suite 1000 displays a workspace environment 110, workflow environment 120, a parameters environment 130, and components environment 140. The workspace, workflow, parameters, and components environments may be displayed within a single interactive application window simultaneously, as tabs within a single interactive application window that display in the window when selected, or by any other arrangement. When the application of the present disclosure is opened by a user, the application 10 automatically searches the computer for existing CAD files, recognizes any existing CAD files, and populates the workspace environment 110 with a display of these files, shown as files 111 in FIG. 3A.

Figure 3B:
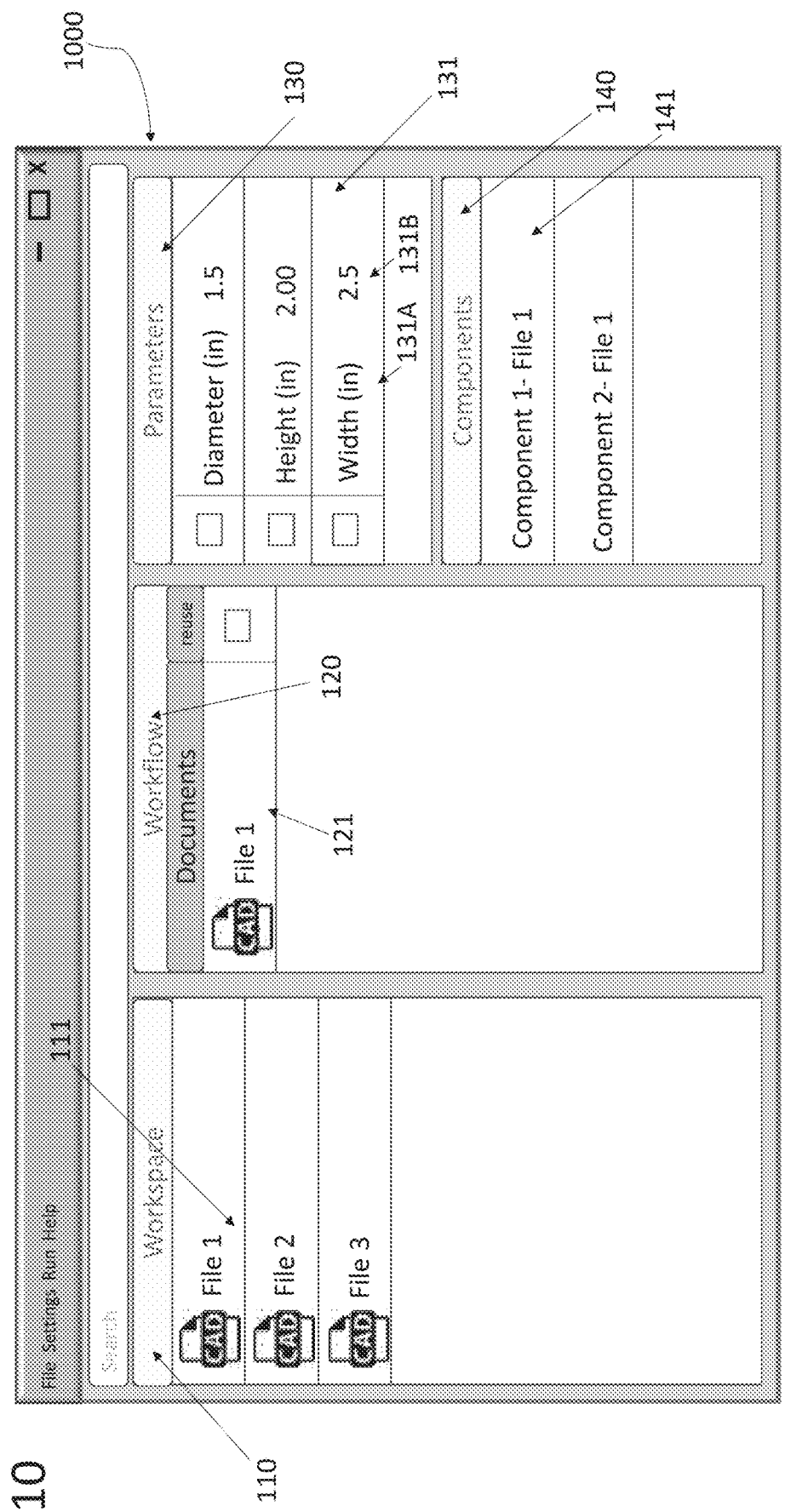

Referring now to FIG. 3B in combination with FIG. 2, a user can then interact with workspace environment 110 to select CAD files 111 that it wishes to modify. The user can then import the files 111 it seeks to modify into the workflow environment 120 by dragging and dropping files 111 from workspace 110, or by any other mechanisms known to those of skill in the art. Once the CAD documents are imported into workflow environment 120, they become workflow files 121.

When a user imports CAD files 111 into workflow environment 120 such that they become workflow files 121, application 10 automatically extrapolates parameters contained within files 121 and displays the extrapolated parameters 131 in parameter environment 130. The parameter environment 130 displays each parameter 131 by name 131A and its corresponding numerical value 131B. Application 10 further identifies any component files within workspace file 121 and displays the names 141 of these component files within the component environment 140.

Referring now to FIGS. 3B and 3C in combination with FIG. 2, a user can then select the parameters 131 that it seeks to modify. After a user has selected the parameters it seeks to modify, it instructs application 10 to generate and display an interactive form 2000. Form 2000 may be displayed in a window separate from interactive suite 1000 or may be displayed in any other suitable arrangement. Interactive form 2000 displays each parameter 131 selected by the user and provides a corresponding editable window 230 that allows the user to edit the associated numerical values 131B of selected parameters 131. Once the user inputs the new desired numerical values 231B for each selected parameter 131, the user runs application 10. Application 10 takes the user inputs 231B provided in form 2000 and interfaces with existing CAD software 100. The application 10 provides the user inputs 231B from form 2000 to the existing CAD software 100 and causes the existing CAD software 100 to generate new CAD files 211 corresponding to each unmodified workspace file 121 containing therein new, modified parameters 231B.

In some embodiments, new CAD files 211 may be generated outside of the native CAD environment. Alternatively, application 10 may cause new CAD files 211 to be generated in the native CAD environment. In accordance with aspects and embodiments, application 10 may enable the user to select if it wishes the new CAD files 211 to be generated outside the native CAD environment or if it wishes for new CAD files 211 to be generated within the CAD environment.

As a further example and in accordance with aspects and embodiments, if a given workspace document 111 is a master file of an assembly consisting of 15 components, importing the master file 121 into workflow environment 120 will populate the components environment 140 with each component file 141 in master file 111. Each of the 15 component files 141 of master file 111 will display in component environment 140. Upon importing master file 111 into workspace environment 120, application 10 will extrapolate each parameter 131 contained within master file 111 and populate the parameter environment 130 with these parameters 131. The user can then select which of the parameters 131 it seeks to modify, thereby generating interactive form 2000.

In accordance with embodiments, interactive form 2000 may display, in addition to each selected parameter 131 and input window 231, additional information and input windows. For example and referring to FIG. 3C, form 2000 may allow a user to identify where new CAD files 211 should be saved on the computer by inputting this information into window 232. Form 2000 may further allow the user to specify the name which to assign each of the new files 211 by inputting this information into window 233. Alternatively, a user may simply select to "reuse" the file names associated with workspace files 121 by selecting the "reuse" box 122 such that the window 2000 does not require new file name inputs into window 232.

In accordance with aspects and embodiments, application 10 can be used to modify any type of CAD document. A user can use application 10 to modify component files by importing the component files displayed in workspace 110 into workflow environment 120. Application 10 can also be used to modify assemblies. A user can input a master file 111 into workspace 120, and when the master file is converted into workspace master file 121, each of the component files 141 in the master file will be displayed in the component environment 140.

In accordance with aspects and embodiments, application 10 can be used to modify aspects and attributes of CAD documents separate from components and parameters, and a given CAD document need not have embedded components and parameters contained therein to benefit from application 10. For example, application 10 can be used to change the file name of a CAD file and may advantageously be used to modify the file names of several CAD files simultaneously. Alternatively, if components are extracted from a given file, application 10 can be used to easily rename these components in a single step. Application 10 may also be used to copy existing CAD files and may advantageously be used to copy several CAD files in a single step.

In accordance with embodiments, application 10 may be used to modify unrelated CAD files. For example, a first CAD file 111 may be for a first assembly and a second CAD file 111 may be for a second, unrelated assembly. Both the first and second assemblies can be input into workspace environment 120 for simultaneous modification. All of the parameters and components for each of assemblies 111 will be displayed in the parameter environment 130 and component environment 140, respectively. A user can select parameters from both assemblies and form 2000 will generate input windows 230 such that the parameters of each, unrelated, assembly, can be modified in a single run of application 10. This enables an unlimited number of CAD files to be modified by application 10 easily and quickly.

In accordance with aspects and embodiments, form 2000 of application 10 is fully customizable. That is, form 2000 is generated in response only to user inputs. A user can thus perform modification of multiple parameters in a single run or can select a single parameter for modification. Each time application 10 is used by user, a new form 2000 may be generated in response to user selections. Form 2000 may further by customizable in ways dependent of parameter selection. For example, certain templates may be selected whereby only certain information is required to complete form 2000. A user may select a template of form 2000 that displays only the selected parameters. Alternatively, a user may select a template of form 2000 that displays the option to rename files and relocate files. Similarly and in accordance with embodiments, a user may generate their own templates by creating and saving custom-generated forms. Moreover, in embodiments where application 10 is used to modify features of CAD files unrelated to parameters, such as file and component names and/or to copy files, a form 2000 can be generated provided that at least one CAD file 121 is present in CAD workspace 120.

In accordance with aspects and embodiments, form 2000 may be saved with the CAD files on which it is designed to modify. The combination of form 2000 and CAD files on which form 2000 is designed to operate may be referred to herein as a file "bundle." The bundle file may be of an archive file format that supports lossless data compression such as a .zip file or any other type of file known in the art. The bundle may include form 2000 and some or all of a collection of CAD files on which form 2000 operates, including components, assemblies, drawings, presentations, projects, and other types of CAD files. The bundle may be shared with other CAD users such that the creator of the bundle can provide a second user with everything the second user needs to quickly manipulate a plurality of CAD files with a given form 2000. Additionally, the bundle also provides the first user with an easy way of providing, sending or transferring by any known means, a second user with all the files and form 2000 the second user needs perform modifications when the second user does not have the necessary files on their local computer. In accordance with aspects and embodiments, application 10 may generate bundles by execution of a single command. For example, when a form 2000 is saved, the user may also select through application 10 the "save bundle" feature that creates the bundle. The bundle may then be modified by the user once created by application 10 by, for example, adding or removing additional files.

In accordance with aspects and embodiments, application 10 may enable a user to readily make design modifications in an assembly to accommodate the assembly's sourcing. For example, application 10 can be used to convert metric standard plate value thicknesses in a given assembly to English standard plate thickness values. This thus enables a single, modeled assembly to be easily and rapidly modified to accommodate sourcing in different countries.

In accordance with aspects and embodiments, the application of the present disclosure can further be used to generate a new CAD file from an existing CAD file having different angle projections. For example, a first CAD file having an object shown in a first angle projection can be readily and easily used by the disclosed application to generate a second CAD file showing the object in a third angle projection.

The application of the present disclosure may further advantageously communicate and interface with other computer programs. For example, the disclosed application may be configured to input new parameter values 231B from a spreadsheet file, for example a Microsoft Excel spreadsheet. This feature thus enables certain specifications generated outside of CAD files, for example, in accordance with manufacturer specifications, to be input into the application such that new CAD files 211 can be generated based on modified parameters 231 provided in spreadsheet form.

In accordance with aspects and embodiments, the application of the present disclosure may further include additional functionalities. For example, when application 10 is used to generate modified CAD files 211 having new parameters 231, new CAD files 211 may advantageously include information on new weld lengths and component and assembly weights.

In accordance with aspects and embodiments, the disclosed application may have features that enable a user to specify further features of output CAD files 211. For example, a user using application 10 to generate new CAD files 211 may specify that the new files 211 can be editable. Alternatively, a user may specify when running application 10 that new CAD files 211 are to be non-editable. Such a selection thus enables new files 211 to be viewed in CAD software but locks files 211 from being modified in the CAD software. A user can also further select the desired output file format. For example, new files 211 can be exported to PDF.

It will be appreciated by those of skill in the art that the application disclosed herein may be provided to a user by any means known in the art, including for example, as an internet download or as encoded on a data storage medium such as CD-ROM or DVD. The application of the present disclosure is controlled in its execution by the processor of the computer device and intermediate storage of application data may be accomplished by using the computer's RAM.

The present disclosure contemplates various versions of the application including but not limited to a cloud-based application and a mobile phone application. In accordance with aspects and embodiments, a cloud-based application in accordance with the features disclosed herein enables users to modify and manipulate CAD files from anywhere where there is an internet connection. A mobile, cloud-based, version of the application enables a user to modify CAD documents in real time and on-site when working with manufacturers and the like to generate modified models having newly specified parameters.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled in the art will readily observe that numerous modifications, applications and alterations of the device and method may be made while retaining the teachings of the present invention.

The invention claimed is:

1. A method of modifying a first CAD file stored in a computer memory of a computer, the computer memory further comprising CAD software and a CAD modifying application, the method comprising:
    building a workflow environment in the CAD modifying application by a processor of the computer and being displayed on a display of the computer, where the CAD modifying application runs on the computer separately from the CAD software, the workflow environment including the first CAD file;
    wherein building the workflow environment includes receiving an input selecting the first CAD file from a plurality of CAD files displayed in a workspace environment, where the workspace environment and workflow environment are displayed by the CAD modifying application in a single window of a display of a computerized user interface;
    modifying, by the processor, at least one parameter associated with the at least one CAD file to create at least one modified parameter within the CAD modifying application;

generating, by the processor, a second CAD file from the first CAD file and the at least one modified parameter by the CAD modifying application; and saving the second generated CAD file to the memory of the computer.

2. The method of claim 1, wherein the workspace environment is created automatically by the processor as instructed by the CAD modifying application.

3. The method of claim 2, wherein the workspace environment displays all CAD files stored on the computer on the display of the computer.

4. The method of claim 3, wherein the workflow environment is created by dragging and dropping the first CAD file from the workspace environment into the workflow environment using an input device.

5. The method of claim 4, wherein selecting the first CAD file from the plurality of CAD files displayed in the workspace environment causes the processor to populate a component environment.

6. The method of claim 1, wherein selecting the first CAD file from the plurality of CAD files displayed in the workspace environment populates a parameter environment.

7. The method of claim 6, wherein the first CAD file is an assembly file that includes at least two component files.

8. The method of claim 6, wherein components displayed in the component environment correspond to the at least two component files of the assembly file.

9. The method of claim 6, wherein selecting a parameter from the parameter environment causes the processor to generate an interactive form within the CAD modifying application having a corresponding editable parameter window.

10. The method of claim 9 further comprising receiving an input comprising a modified parameter value through an input to the user interface in the editable parameter window, the modified parameter value being different from the parameter value in the CAD file.

11. The method of claim 9, further comprising saving the interactive form within the CAD modifying application as a template interactive form for future use.

12. The method of claim 11, further comprising the step of communicating the received user input to the CAD software.

13. The method of claim 12, wherein communication of the inputs from the CAD modifying application causes the processor, using the CAD software to output the second CAD file.

14. The method of claim 1, further comprising the step of combining the second CAD file with the plurality of CAD files in order to generate a master file that reflects a virtual model of an assembly when opened in the CAD software.

15. A method of modifying a plurality of CAD files, the method comprising:

opening CAD software stored in a computer memory by a processor;

opening a CAD modifying application stored in the computer memory by the processor;

importing, by the processor, original CAD files into the CAD modifying application;

building a workflow environment in the CAD modifying application by the processor, the workflow environment including the original CAD files, wherein building the workflow environment includes receiving an input selecting at least one of the plurality of CAD files displayed in a workspace environment, where the workspace environment and workflow environment are displayed by the CAD modifying application in a single window of a display of a user interface;

wherein the CAD modifying application causes the processor to extract at least one of parameters and components from the imported original CAD files and display, on a display of the computer, the extracted parameters within the CAD-modifying application;

using the user interface of the CAD modifying application to assign a new value to at least one of the extracted parameters and components to create at least one modified parameter or component through an input to the computer;

interfacing the CAD modifying application with the CAD software, wherein interfacing causes the processor, through the CAD modifying software, to communicate the at least one modified parameter to the CAD software and further causes the CAD software to generate a modified CAD file corresponding to the original CAD files having the at least one modified parameter or component; and saving the modified CAD file to the computer memory.

16. The method of claim 15, wherein the method further comprises using the CAD modifying application to cause the processor to create a plurality of modified CAD files.

17. The method of claim 16, wherein the method further comprises using an interactive form to cause the processor to create the modified CAD files, and the method includes saving the interactive form with the modified files to create a file bundle.

18. The method of claim 17, wherein after the modified CAD files corresponding to the original CAD files having the plurality of modified parameters or components are generated, a second set of modified parameters are created and used to generate a second set of modified CAD files corresponding to the original CAD files having the second set of modified parameters.

19. The method of claim 15, wherein the CAD modifying application is cloud based.

20. The method of claim 19, wherein the CAD modifying application is a mobile application.

* * * * *